March 20, 1962 E. O. MUELLER 3,026,433
BRUSH HOLDER SUPPORT FOR DYNAMOELECTRIC MACHINE
Filed May 28, 1959

WITNESSES:
Bernard R. Gieguey
E. Herbert Liss

INVENTOR
Erich O. Mueller
BY 7. P. Lyle
ATTORNEY

United States Patent Office 3,026,433
Patented Mar. 20, 1962

3,026,433
BRUSH HOLDER SUPPORT FOR DYNAMO-
ELECTRIC MACHINE
Erich Otto Mueller, Irwin, Pa., assignor to Westinghouse
Electric Corporation, East Pittsburgh, Pa., a corporation of Pennsylvania
Filed May 28, 1959, Ser. No. 816,562
3 Claims. (Cl. 310—239)

The present invention relates to a brush holder support for dynamoelectric machines, and more particularly, to an improved brush holder support for supporting and insulating brush holders which must resist severe mechanical strains and stresses.

It is often desirable and convenient to support brush holders of a dynamoelectric machine from some part of the frame or housing. Thus it becomes essential to provide adequate insulation in order to prevent the grounding of current carrying parts. It has been the practice to provide an insulating support having a metal part secured to the frame and another metal part secured to the brush holder. The two metal parts are secured together through a dielectric material. These insulators have been molded using various insulating compounds. Always present is the problem of mechanical and electrical failure due to relatively high shrinkage of the insulating material during molding and curing and the difficulty of obtaining a mechanical connection between the parts capable of withstanding the severe torque and vibration forces to which the brush holder support is subjected. Particularly with motors for use in railway and other traction vehicles, the intense vibrations tend to loosen the metal parts from the insulating material. This causes undesirable wobble of the brush holder and consequent sparking and burning of the brush as well as inefficient operation of the machine.

Some requirements for a brush holder support in traction motors, by way of example, are an ability to withstand; (1) 80 ft. pounds torque; (2) a tension of 1500 pounds; (3) temperatures ranging from —25° C. to 100° C.; (4) 8000 volts alternating current for 60 seconds; (5) six power flashes at 500 volts and 500 amps. for 12 cycles.

The required torque and tension are essential because the brush holder support must be tightly bolted to the frame and must be able to withstand the above stated values of torque and tension without affecting the rigidity of the support. In addition, use in a railway vehicle subjects the brush holder to severe stresses and strains due to vibrations resulting from the motion of the vehicle.

The unique and novel structure of the present invention renders it able to withstand stresses, strains, and electrical tests far in excess of the minimum required values stated above. The new brush holder utilizes an epoxy-type resin insulating material which is molded or cast between two metal parts. These metal parts have interfitting portions opposed to and spaced from each other. The insulating compound encapsulates these metal parts. The metal parts have irregular surfaces thereon in order that they may be better retained within the insulating compound. The particular epoxy-type resin which is preferred in the present invention flows readily into the interstices on the irregular surfaces thereby holding the parts together more securely and more rigidly.

Although epoxy-type resin is preferred in the particular embodiment of the invention herein described, it should be understood that any insulating material which may be injection molded or pressure molded or cast may be used, as for example, polyester-type resins and mixtures of glass and mica.

The principal object of the present invention is to provide an improved brush holder support which is economical to manufacture and which has high mechanical strength to resist torque and vibration forces.

Another object of the present invention is to provide an improved brush holder support for a dynamoelectric machine which is economical to manufacture and which has high mechanical strength to resist torque and vibration forces as well as high dielectric strength and resistance to flashover.

A further object of this invention is to provide an improved brush holder support for dynamoelectric machines having high mechanical strength to resist torque and vibration forces which utilizes novel irregular surfaces on the interfitting parts for holding the support together and which is simple and economical to manufacture.

Other objects and advantages of the invention will be apparent from the following detailed description, taken in connection with the accompanying drawings, in which.

The brush holder herein shown and described is adapted particularly for use in traction motors although it is to be understood that the invention is not limited in this connection but may be used with other and different forms of dynamoelectric machines.

Figure 1:
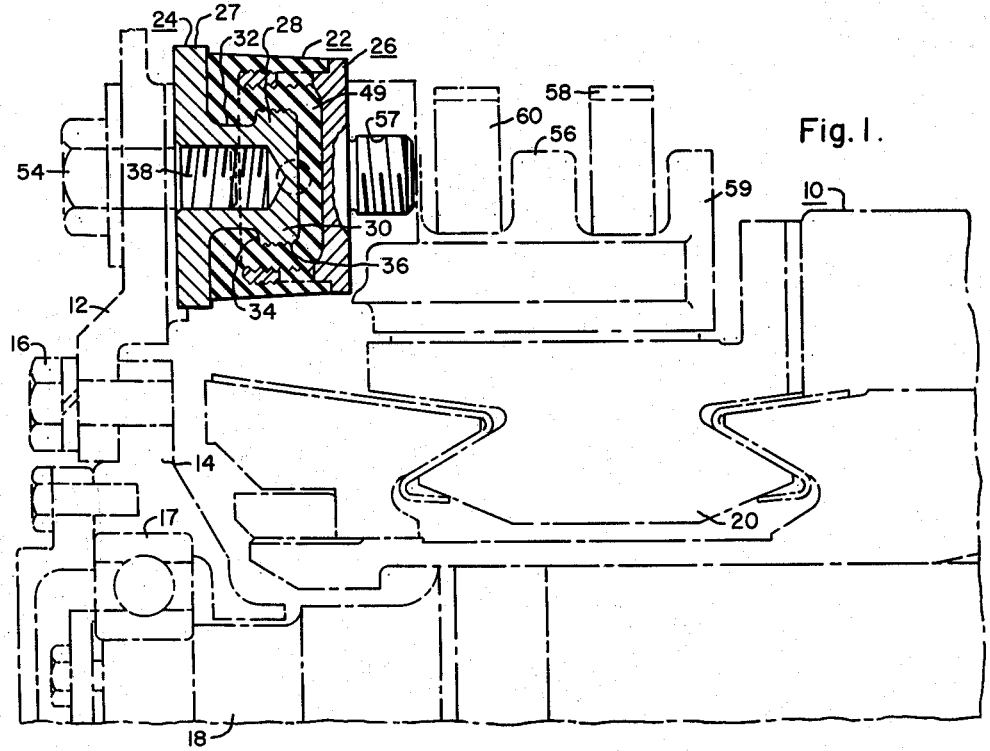
FIG. 1 is a partial longitudinal sectional view of a portion of a dynamoelectric machine embodying the invention.
Figure 4:
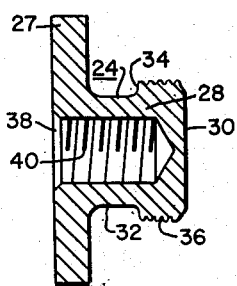
FIG. 4 is a longitudinal cross section view of the stud portion of brush holder support of this invention.

Referring now to the drawings, FIG. 1 shows the commutator end of a motor 10. The motor 10 has an end bracket 12 which closes the motor frame (not shown) and is held thereon in any suitable manner. The end bracket 12 has a central opening in which is received a bearing bracket 14 which is secured to the end bracket 12 in any suitable manner, as for example, by bolts 16 as shown. A suitable bearing 17 is received in bearing bracket 14. An armature shaft 18 is supported at one end in bearing 17 of bearing bracket 14. The shaft 18 is supported at its other end in a similar bearing bracket (not shown). A commutator 20 is mounted near the end of shaft 18 adjacent the end bracket 12.

A plurality of brush holder supports 22 are mounted on the inner face of the end bracket 12 at suitable circumferentially spaced positions. One of these brush holder supports is shown mounted in position on end bracket 12 in FIG. 1. The brush holder support 22 includes a stud portion 24 and a cup portion 26. The stud portion 24 includes a flat plate or disc 27 having projecting therefrom and concentric therewith a stud 28. The stud 28 has an enlarged diameter head portion 30 and a reduced diameter shank portion 32. The reduced diameter shank portion 32 lies intermediate the head portion 30 and the plate 27, forming the shoulder 34 facing the plate portion 27. The peripheral edge of head portion 30 of stud 28 is knurled as shown in the drawings at 36. A recess 38 extends from a surface of disc 26 inwardly through the disc 27 into the stud 28. Recess 38 is threaded as shown at 40 in the drawings.

Cup portion 26 of brush holder support 22 comprises a flat disc or plate 42 having an annular flange 44 which is spaced inwardly from the outer edge of disc 42. The outer surface of flange 44 is knurled as shown in the drawings at 46 and the inner surface of flange 44 has a plurality of circumferential grooves 48. The stud 28 is received centrally within cup portion 26 and is spaced from the surfaces thereof. The space between the stud portion and the cup portion is filled with an insulating composition 49 which encapsulates the flange 44 and the stud 28. In the illustrated embodiment of the invention an epoxy-type resin is the preferred material for the insulating composition, but it will be understood that any suitable insulating composition that may be injection molded, press molded or cast, can be used. Examples of other suitable materials are glass polyester resins, glass and mica compositions and other suitable plastic materials. Projecting from the surface of plate or disc 42 remote from the flange 44 is a threaded stud 50. The insulating material 49 fills all the interstices formed by the grooves and knurls around the stud portion 24 and in the cup portion 26.

Figure 3:
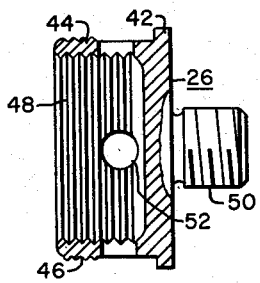
FIG. 3 is a longitudinal cross section view similar to FIG. 2 showing the cup portion of the invention.
Figure 2:
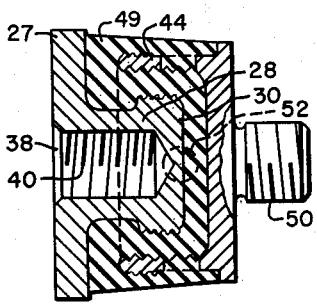
FIG. 2 is a longitudinal cross section view of the brush holder support of this invention.

It can thus be seen that a mechanically strong, rigid insulating support is provided which will resist both torque and vibration forces. In order to improve the mechanical stability and resistance to torque, in particular, the cup portion 26 of the brush holder support may include a plurality of radially extending circumferentially spaced openings 52 in flange 44 as shown best in FIG. 3. The grooves 48 and knurled surfaces 36 and 46 provide resistance against tension forces. The shoulder 34 also adds to the mechanical strength and resistance against tension forces. Thus, a strong brush holder well adapted to resist strong tension forces is provided. The knurled surfaces 36 and 46 also provide resistance against torque. However, it can be seen that the grooved surface 48 will not resist torque to prevent turning of the insulator within the cup portion 26. For this reason openings 52 are provided; the insulating material flows into the openings and forms a continuous body connecting the exterior portions of the insulating material with the portions between the stud and the interior surface of the cup. This provides further additional resistance to torque and prevents turning of the insulator within the cup.

The brush holder support 22 is secured on the end bracket 12 by threaded bolt 54 extending through the end bracket into the threaded recess 38 of the stud portion 24 of brush holder 22. This bolt 54 must be tightened securely and this is one of the times when the resistance to torque is required in the brush holder support. When the bolt 54 is tightened, 80 ft. pounds of torque is applied, in a typical application of the brush holder support. The unique structure of the present invention enabled the brush holder support, under tests, to withstand a great deal more torque than this. In a destructive test, 195 ft. pounds torque was applied without the brush holder parts showing any tendency to loosen or separate. The metal stud 50 failed before the parts loosened or separated. This occurred when 195 ft. pounds torque was applied. The required tension of a brush holder support of this invention for railway motor application is 1500 pounds. In tests, the insulator failed by separation at 5000 pounds tension.

Threadedly secured to the brush holder support 22 by means of the threaded stud 50 is a brush holder 56 of any usual construction. The brush holder 56 has a threaded opening 57 for reception of the stud 50. Brush holder 56 overlies the commutator 20 and has a brush box 59 for supporting brushes 60 therein, and springs 58 overlying the brushes to urge them against the rotating commutator.

A brush holder support has been shown and described which is designed to provide high resistance to torque and vibrational forces that occur in many applications. It can be seen that the brush holder support provides good insulation between the brush holder and the other parts of the motor to prevent the brush holder from being grounded. A good insulating material is provided between the metal portion securing the brush holder to the end bracket and the metal part securing the brush holder to the brush holder support. By providing these metal portions for securing parts together, a very rigid connection is made while at the same time they are well insulated from each other since the epoxy-type resin material preferred in this embodiment is a good dielectric material as well as having good mechanical strength. In railway applications, the dielectric tests require that the insulator withstand 8000 volts A.C. for 60 seconds. None of the test insulators failed in a destructive test at 18,000 volts A.C. None of the production insulators failed during the 8000 volts test. The unique surfaces and shapes of the metal parts in cooperation with the epoxy-type resin which is very fluid while being molded, forms a rigid, high-strength brush holder.

Although a certain specific embodiment of the invention has been shown and described for the purpose of illustration, it will be understood that other and different modifications of the invention may be made. It is to be understood that this present disclosure has been made only by way of example and that numerous changes in the details, combination and arrangement of parts may be accomplished; for example, the stud and recess for connecting to the brush holder and end bracket, respectively, may be reversed. Other types of insulating material may be used. Any suitable means may be used for connecting the brush holder support to the brush and to the end bracket. While the invention is shown in its preferred embodiment, it is not so limited but is capable of various modifications within the scope of the invention.

I claim as my invention:

1. In a brush holder support for supporting a brush holder on the housing of a dynamoelectric machine, an insulator comprising a first flat plate having an annular flange spaced inwardly from the peripheral edge of said plate forming a cup member and a second flat disc having a centrally located stud projecting from one side thereof, said stud being centrally located within said cup in spaced relation to the inner surfaces thereof, said flange having a coarsely knurled outer surface and an annularly grooved inner surface, said stud having a coarsely knurled surface, a molded insulating composition filling said cup and encapsulating said stud and said flange, means on one of said flat plates for connecting a brush holder thereto and means on the other of said flat plates for connecting the brush holder support to the housing of a dynamoelectric machine.

2. In a brush holder support for supporting a brush holder on the housing of a dynamoelectric machine, an insulator comprising a first flat plate having an annular flange spaced inwardly from the peripheral edge of said plate forming a cup member and a second flat disc having a centrally located stud projecting from one side thereof, said stud being centrally located within said cup in spaced relation to the inner surfaces thereof, said flange having a coarsely knurled outer surface, a circumferentially grooved inner surface and a plurality of circumferential spaced openings, said stud having a coarsely knurled peripheral surface, a molded insulating composition filling said cup and encapsulating said stud and said flange, means on one of said flat plates for connecting a brush holder thereto and means on the other of said flat plates for connecting the brush holder support to the housing of a dynamoelectric machine.

3. In a brush holder support for supporting a brush holder on the housing of a dynamolectric machine, an insulator comprising a first flat plate having an annular flange spaced inwardly from the peripheral edge of said plate forming a cup member and a second flat disc having a centrally located stud projecting from one side thereof, said stud being centrally located within said cup in spaced relation to the inner surfaces thereof, said flange having a coarsely knurled outer surface, a circumferentially grooved inner surface and a plurality of circumferentially spaced openings, said stud having an enlarged head, at its free end, said head having a coarsely knurled peripheral surface, a molded insulating composition filling said cup and encapsulating said stud and said flange, means on one of said flat plates for connecting a brush holder thereto and means on the other of said flat plates for connecting the brush holder support to the housing of a dynamoelectric machine.

References Cited in the file of this patent
UNITED STATES PATENTS

| | | |
|---|---|---|
| 2,061,821 | Apple | Nov. 24, 1936 |
| 2,451,969 | Mueller | Oct. 19, 1948 |
| 2,726,280 | Demurjian | Dec. 6, 1955 |
| 2,747,117 | Litz | May 22, 1956 |
| 2,759,116 | Glass | Aug. 14, 1956 |
| 2,831,991 | Perkins | Apr. 22, 1958 |
| 2,897,386 | Jones | July 28, 1959 |